United States Patent [19]
Horiguchi et al.

[11] Patent Number: 5,973,748
[45] Date of Patent: Oct. 26, 1999

[54] RECEIVING DEVICE AND RECEIVING METHOD THEREOF

[75] Inventors: Mari Horiguchi; Teruyoshi Komuro, both of Kanagawa, Japan

[73] Assignee: Sony Corporation, Tokyo, Japan

[21] Appl. No.: 08/969,494

[22] Filed: Nov. 13, 1997

[30] Foreign Application Priority Data

Nov. 15, 1996 [JP] Japan ................................ 8-304401

[51] Int. Cl.⁶ .................................................. H04N 5/46
[52] U.S. Cl. ........................ 348/554; 348/555; 348/556; 348/558; 348/461; 370/465; 370/466; 386/45; 386/46; 386/125
[58] Field of Search .................................... 348/461, 465, 348/467, 474, 423, 554, 555, 556, 558, 845, 845.2; 370/465, 466, 487, 490, 433, 436, 437; 386/46, 45, 125, 126, 111, 108

[56] References Cited

U.S. PATENT DOCUMENTS

| | | | |
|---|---|---|---|
| 5,459,526 | 10/1995 | Yamada | 348/558 |
| 5,481,543 | 1/1996 | Veltman | 348/465 |
| 5,502,499 | 3/1996 | Birch | 348/523 |
| 5,530,484 | 6/1996 | Bhatt | 348/558 |
| 5,592,450 | 1/1997 | Yonemitsu | 369/48 |
| 5,663,768 | 9/1997 | Yang | 348/558 |
| 5,673,254 | 9/1997 | Crayford | 370/231 |
| 5,684,542 | 11/1997 | Tsukagoshi | 348/467 |
| 5,754,242 | 5/1998 | Ohkami | 348/555 |
| 5,787,259 | 7/1998 | Haroun | 348/552 |
| 5,850,266 | 12/1998 | Gimby | 348/558 |

Primary Examiner—John K. Peng
Assistant Examiner—Wesner Sajous
Attorney, Agent, or Firm—Frommer Lawrence & Haug, LLP.; William S. Frommer; Dennis M. Smid

[57] ABSTRACT

In order to play back a plurality of kinds of image data using a single device, a 1394 receiver receives data transmitted via an AV bus according to a format of an IEEE 1394 standard. A separating circuit then determines a format of this data by referring to a prescribed region of a CIP header of this data. When this data is MPEG-PS data, this data is outputted to an MPEG-PS decoder. When this data is MPEG-TS data, this data is outputted to an MPEG-TS decoder. When this data is DVCR SD data, this data is outputted to a DVCR-SD decoder. The MPEG-PS decoder, MPEG-TS decoder and the DVCR-SD decoder then decode the supplied data of respective formats.

22 Claims, 5 Drawing Sheets

FIG.4

| | | | | | | | | |
|---|---|---|---|---|---|---|---|---|
| 0 | SID | DBS | FN | QPC | SPH | rsv | DBC | 0 |
| 0 | FMT | | | FDF | | | | 1 |

RECEIVING DEVICE AND RECEIVING METHOD THEREOF

BACKGROUND OF THE INVENTION

The present invention relates to a receiving device and method thereof, and more particularly relates to a receiving device and method thereof decoding received data at any of a plurality of decoders in accordance with a format of the received data.

In recent years, DVD (Digital Versatile Disc)-Video (hereinafter referred to as "DVD") has been standardized, so that it is expected to become widespread. With the DVDs, video data is compressed using an MPEG (moving Picture Experts Group)—PS (Program Stream) method and recorded. A DVD player plays back a DVD at a driving unit, with MPEG-PS data played back from the DVD being decoded at a decoder and outputted to a television. An image corresponding to this data is then displayed.

On the other hand, digital satellite broadcasts are also becoming widespread. Video data transmitted by these digital satellite broadcasts is compressed using an MPEG-TS (Transport Stream). A receiver for receiving the digital satellite broadcasts then has a built-in decoder for decoding MPEG-TS data.

However, as described above, when a number of images such as digital satellite broadcast images or images from digital video cassette recorders (DVCR) etc. are to be enjoyed in addition to the images played back by the DVD player, because of the image data formats being different in correspondence to these images, mutually independent playback systems have to be provided in order to playback all of the image data. This therefore causes the device to be large in size.

In order to resolve the aforementioned problems, the present invention enables playback of data of these images using a single device by connecting a plurality of devices handling these various kinds of image data via a digital interface to a device having a plurality of decoders for decoding the image data.

SUMMARY OF THE INVENTION

In order to achieve the aforementioned object, according to the present invention, a receiving device for receiving data encoded in a prescribed data format from a plurality of transmitting devices via a digital interface and decoding the data in accordance with the prescribed data format comprises a receiver, the first decoder, the second decoder and a supplying unit. The receiver is for receiving at least data of the first and second formats. The first decoder is for decoding the data of the first format. The second decoder is for decoding the data of the second format The supplying unit is for supplying data received by the receiver to either of the first and second decoders in accordance with a format of the data.

In this receiving device, the data can be included within a packet and the supplying unit supplies data received by the receiver to either of the first and second decoders in accordance with a value corresponding to a format of the data written to a prescribed region of the packet.

The prescribed region can be a common isochronous packet (CIP) header of an isochronous packet.

The digital interface can be a digital interface conforming to an Institute of Electrical and Electronics Engineers (IEEE) 1394 standard.

The receiver can receive packets having data of whichever of the first and second formats transmitted in isochronous communications of the Institute of Electrical and Electronics Engineers 1394 standard.

The receiving device can further comprise a multiplexer to which data outputted from the first and second decoders are inputted and a display circuit for displaying output data from the multiplexer. The receiver receives the data of the first and second formats in parallel in the isochronous communications and the display circuit displays a plurality of images corresponding to each of the data simultaneously in a single picture in real time.

The receiver of this receiving device can also be made to be capable of receiving data of the third format, and further comprise the third decoder for decoding the data of the third format.

Further, the first, second and third formats can be a program stream formats, of Moving Picture Experts Group (MPEG) system, a transport stream format of MPEG system and a standard definition (SD) format of digital video cassette recorder, respectively.

Moreover, the first and second decoders can each comprise a storage having a storage capacity of at least 1.2 megabytes for temporarily storing data when decoding.

Still further, according to the present invention, a receiving method for receiving data encoded in a prescribed data format from a plurality of transmitting devices via a digital interface and decoding the data in accordance with the prescribed data format, comprises the steps of receiving at least data of first and second formats, supplying the received data to either of the first and second decoders in accordance with a format of the data, and decoding the received data at either of the first and second decoders.

In this receiving method, the data can be included within a packet and the received data is then supplied to either of the first and second decoders in accordance with a value corresponding to a format of the data written to a prescribed region of the packet.

The prescribed region can be a common isochronous packet (CIP) header of an isochronous packet.

The digital interface can be a digital interface conforming to an Institute of Electrical and Electronics Engineers 1394 standard.

The received packets can be packets having data of whichever of the first and second formats transmitted in isochronous communications of the Institute of Electrical and Electronics Engineers 1394 standard.

Further, with this receiving method, each of data outputted from the first and second decoders can be multiplexed and the multiplexed output data can be displayed, the data of the first and second formats can be received in parallel in the isochronous communications, and a plurality of images each corresponding to each of the data can be displayed simultaneously in a single picture in real time.

BRIEF DESCRIPTION OF THE DRAWINGS

FIG. 4 is a view showing a format of a CIP header of the packet of FIG. 3; and

DETAILED DESCRIPTION OF THE PREFERRED EMBODIMENT

Figure 1:
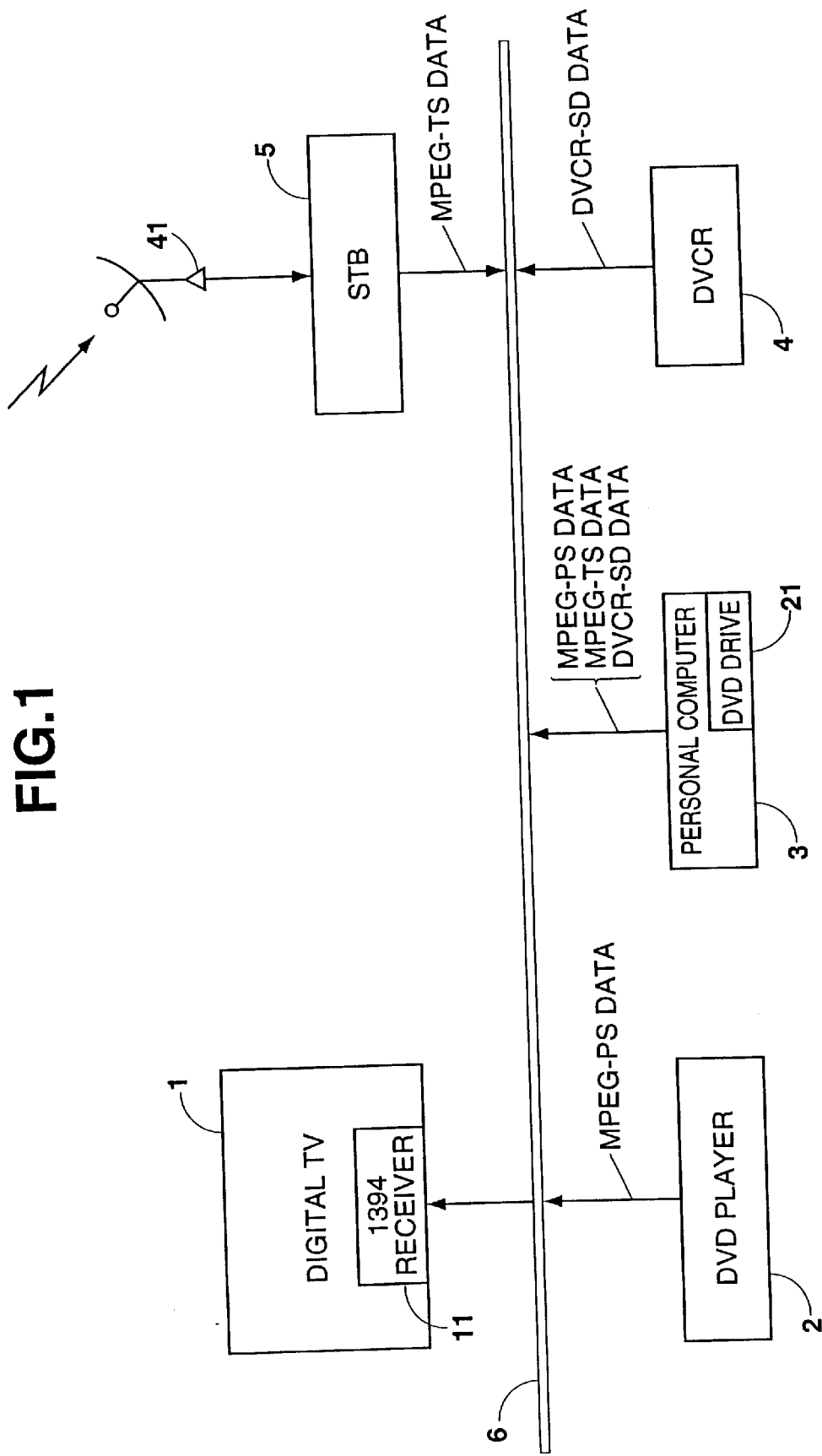
FIG. 1 is a block diagram showing an example of a configuration for an AV system.

FIG. 1 shows an example of a configuration of an AV system. In this AV system, a digital television (digital TV) 1 to which the receiving device according to the present invention is applied is connected to an AV bus 6. A built-in 1394 receiver 11 (receiver) then receives MPEG-PS data, MPEG-TS data and DVCR SD (Standard Definition) data supplied via the AV bus 6. This data is decoded at built-in decoders so that a decoded image is displayed.

A DVD player 2 reads out MPEG-PS data recorded on a DVD and outputs this data to the digital TV 1 via the AV bus 6 with the data being un-decoded.

A personal computer 3 carries out various processings using software and carries out playback of DVD ROMs etc., in addition to DVD-Video using a built-in DVD drive 21 so that image data such as MPEG-PS data, MPEG-TS data and SD data for DVCR etc., are outputted to the digital TV 1 via the AV bus 6.

A DVCR 4 records or plays back image data to or from video cassette tape and outputs DVCR SD data read out from the video cassette tape to the digital TV 1 via the AV bus A Set-Top Box (STB) 5 receives broadcast signals transmitted from man-made satellites for predetermined digital satellite broadcasts via an antenna 41 and outputs image data (MPEG-TS data) for, for example, programs selected by a user, to the digital TV 1 via the AV bus 6.

The AV bus 6 is a bus which conforms to the IEEE (The Institute of Electrical and Electronics Engineers) 1394, High Performance Serial Bus Standard (IEEE 1394 standard).

Figure 2:
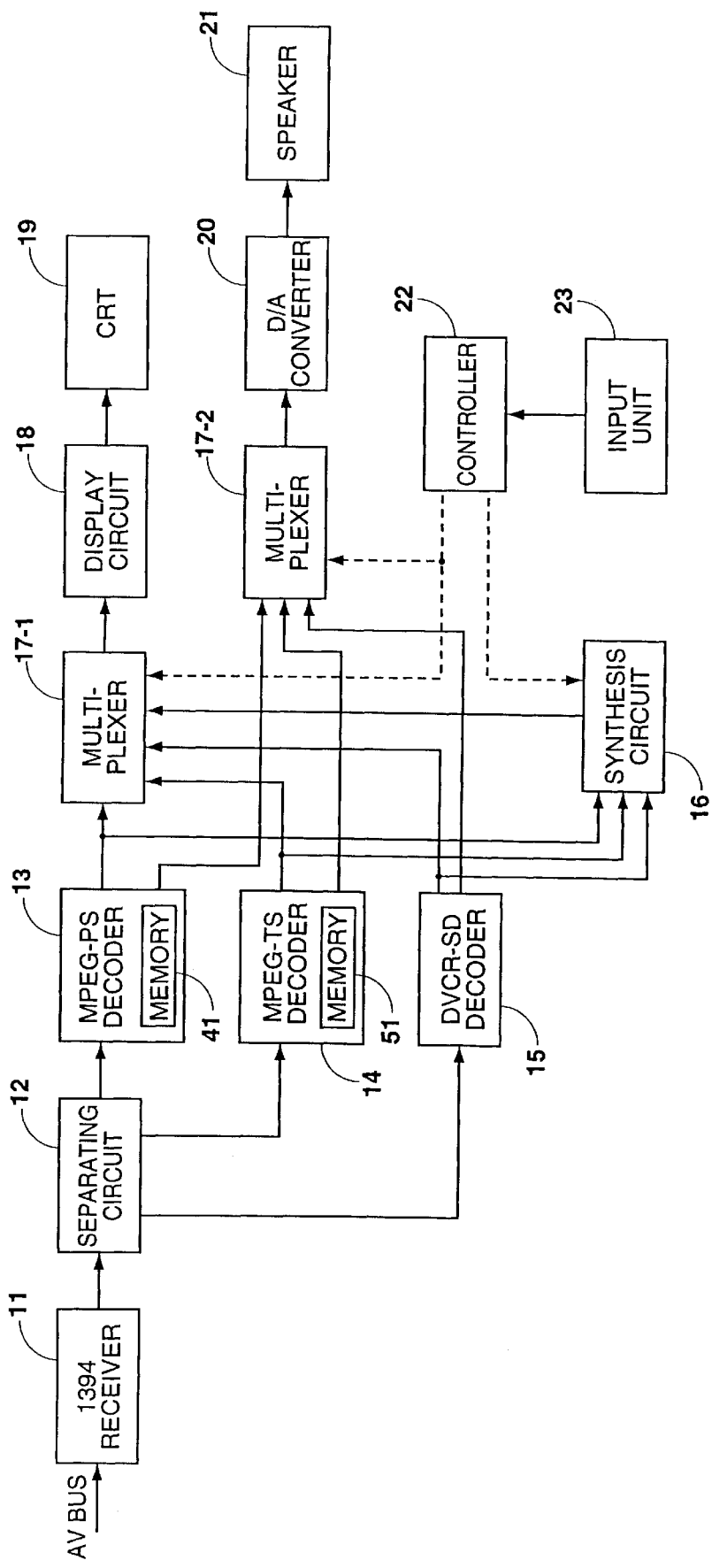
FIG. 2 is a block diagram showing an example of a configuration of a digital TV to which the receiving device according to the present invention is applied.

FIG. 2 shows an example of configuration of the digital TV 1.

At the digital TV 1, the 1394 receiver 11 receives data (packets) transmitted via the AV bus 6 according to a format of an IEEE 1394 standard and outputs the received data to a separating circuit 12 (supplying unit).

The separating circuit 12 determines the format of this data by referring to a prescribed region (to be described later) of a CIP (Common Isochronous Packet) header of the received data and then outputs this data to the decoder corresponding to this format.

Namely, the separating circuit 12 outputs this data to an MPEG-PS decoder 13 (the first decoder) when the supplied data is MPEG-PS data. When the supplied data is MPEG-TS data, the separating circuit 12 outputs this data to an MPEG-TS decoder 14 (the second decoder). When the supplied data is DVCR SD data, this data is outputted to a DVCR SD decoder 15 (the third decoder).

The MPEG-TS decoder 14 decodes supplied MPEG-TS data, outputs a generated digital video signal to a synthesis circuit 16 and a multiplexer 17-1, and outputs a generated digital audio signal to a multiplexer 17-2.

The MPEG-TS decoder 14 has a built-in memory 51 having a storage capacity of at least 1.2 megabytes. This memory 51 is used as a video transport buffer and a decoder buffer conforming to MPEG standards.

The video transport buffer is a buffer of a total of 234.5 kilobytes, with a 0.5 kilobyte transport buffer (TB: Transport Buffer), 10 kilobyte main buffer (MB: Main Buffer) and a 224 kilobyte elementary stream buffer (EB: Elementary Stream Buffer).

The transport buffer of these buffers is used when a header of a packet for the MPEG-TS data is removed.

The main buffer is provided to slow down the rate of the data transfer to the elementary stream buffer. The rate of transfer from the transport buffer to the main buffer is set to be the rate at the time of multiplexing (for example, 18 Mbps) but the rate of the data transfer from the main buffer to the elementary stream buffer is set to be a lower rate (for example, 15 Mbps).

The elementary stream buffer stores the contents of the elementary stream until the arrival of the time corresponding to time stamps PTS (Presentation Time Stamp) and DTS (Decoding Time Stamp) included in the MPEG data. At the arrival of the time, data for one access unit is outputted to a built-in decoder (not shown in the drawings) in the MPEG-TS decoder 14. Data outputted from the elementary stream buffer is then decoded by this decoder.

When carrying out decoding using the MPEG format, the decoder buffer holds the image (picture) to be decoded and a picture for comparing (I picture, P picture etc.). A storage capacity for at least two pictures (an I picture and a P picture) is therefore required at the decoder buffer.

When the image signal is of the NTSC format, one picture comprises 720×480 pixels. As the ratio of a luminance signal Y and two color difference signals Cb and Cr is then 4:2:0, the storage capacity required per one picture is approximately 0.5 Megabytes (=720×480×(4+2+0)/4). Therefore, in this case, a storage capacity of approximately 1.0 Megabytes is required for the decoder buffer for two pictures.

On the other hand, when the image signal is in the PAL format, one picture comprises 720×576 pixels and the ratio of the luminance signal Y and the two color difference signals Cb and Cr is 4:2:0. The storage capacity required per one picture is therefore approximately 0.6 Megabytes (=720×576×(4+2+0)/4). Therefore, in this case, a storage capacity of approximately 1.2 Megabytes is required for the decoder buffer for two pictures.

A storage capacity of at least 1.2 megabytes (≈1.0 Megabytes+234.5 megabytes) is therefore required for the memory 51.

The MPEG-PS decoder 13 decodes supplied MPEG-PS data, outputs a generated digital video signal to the synthesis circuit 16 and the multiplexer 17-1, and outputs generated digital audio data to the multiplexer 17-2.

The MPEG-PS decoder 13 has a built-in memory 41 having a storage capacity of at least 1.2 Megabytes. This memory 41 is used as the aforementioned main buffer, the elementary stream buffer and the decoder buffer. A storage capacity of 8 kilobytes is sufficient for the main buffer in the MPEG-PS decoder 13.

The DVCR-SD decoder 15 decodes supplied DVCR SD data, outputs a generated digital video signal to the synthesis circuit 16 and the multiplexer 17-1, and outputs generated digital audio data to the multiplexer 17-2.

The synthesis circuit 16 performs synthesis for digital signals supplied by the MPEG-PS decoder 13, MPEG-TS decoder 14 and DVCR-SD decoder 15 in such a manner that, for example, three images are displayed in a single picture, with the synthesized digital video signal then being outputted to the multiplexer 17-1.

For example, when one image of the three images is taken to be a main image and another image is taken to be a sub-image for generating an image where the sub-image is set into the main image, the circuit disclosed in, for example, U.S. Pat. No. 4,746,983 can be utilized as the synthesis circuit 16.

When three images are then arranged so as to be displayed as one picture, the circuit disclosed in, for example, Unexamined Published Japanese Patent Application No. 56-136089 can be utilized as the synthesis circuit 16.

In addition, when synthesizing a character string such as the name of the device that outputted the image data, the circuit disclosed in Unexamined Published Japanese Patent Application No. 61-194982 can be utilized as the synthesis circuit 16.

The multiplexer 17-1 outputs any one of the digital signals supplied from the MPEG-PS decoder 13, MPEG-TS decoder 14, DVCR-SD decoder 15 and synthesis circuit 16 to a display circuit 18 in response to a control signal supplied from a control circuit 22.

The multiplexer 17-2 outputs any one of the digital audio signals supplied from the MPEG-PS decoder 13, MPEG-TS decoder 14 and DVCR-SD decoder 15 to a D/A converter 20 in response to a control signal supplied by the control circuit 22.

The display circuit 18 displays an image corresponding to a supplied digital video signal on a CRT 19.

The D/A converter 20 converts the supplied digital audio signal to an analog audio signal and outputs sound corresponding to this signal at a speaker 21.

The control circuit 22 receives signals corresponding to user operations from an input unit 23 and outputs prescribed control signals corresponding to these signals to the multiplexer 17-1, the multiplexer 17-2 and the synthesis circuit 16.

Next, the operation of the digital TV 1 will be described.

First, the 1394 receiver 11 of the digital TV 1 receives packets transmitted with asynchronous communications and data (data fields) included in the received packets is outputted to the separating circuit 12.

Figure 3:
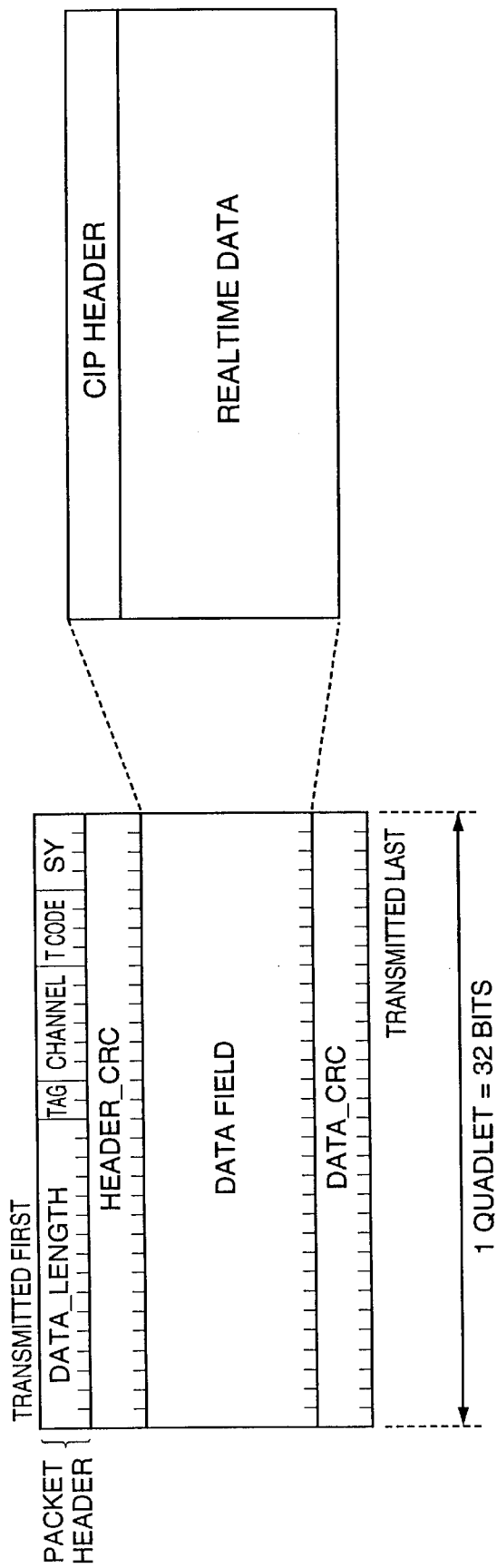
FIG. 3 is a view showing a structure of an asynchronous communication packet.

FIG. 3 shows the configuration of packets for asynchronous communication. Asynchronous communications packets comprise a packet header, a header CRC, a data field and a data CRC.

The packet header further comprises "Data_length" expressing the length of the data, "Tag" expressing the kinds of data format transmitted by this packet, "Channel" expressing the channel number of this packet (one of 0 to 63), "tcode" expressing the processing code and synchronization code "Sy" specified in each application. Header CRC (Header_CRC) is packet header error detection code and data CRC (Data_CRC) is data field (Data field) error detection code. A data field comprises a CIP header and real time data of which the real time data is the original data that is transmitted.

Figure 4:
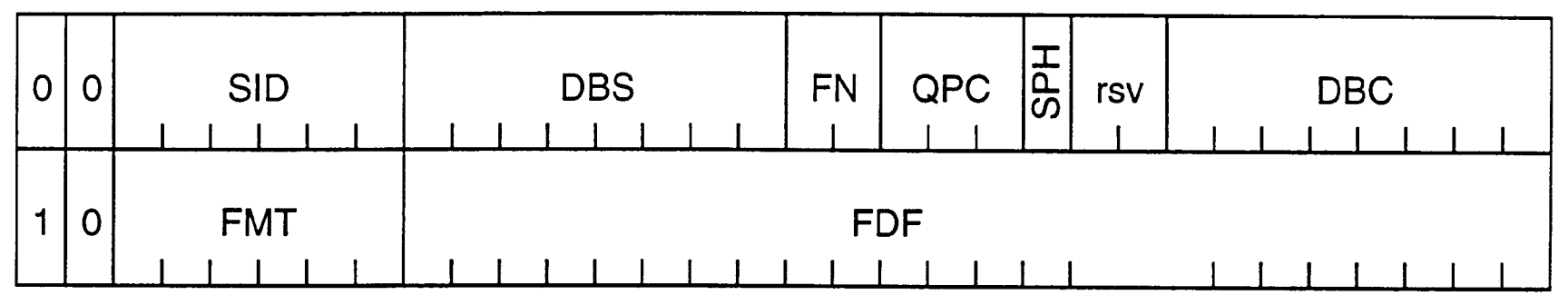

FIG. 4 shows a CIP header format. The CIP header comprises a send node number SID, a packeting unit DBS, a dividing number FN for data in packeting, a quadlet number QPC (one quadlet is four bytes) added to fit data lengths to a prescribed fixed data length at the time of dividing, a source packet header flag SPH, a counter DBC for detecting missing of packets, a signal format FMT and a format dependent field FDF. Here, rsv is a reserved region.

Next, the separating circuit 12 refers to the value of the FMT region of the CIP header of the supplied data and determines which of MPEG-PS data, MPEG-TS data and DVCR SD data the supplied data is in accordance with this value.

When the separating circuit 12 determines that the data is MPEG-PS data, this data is outputted to the MPEG-PS decoder 13. When the data is determined to be MPEG-TS data, this data is outputted to the MPEG-TS decoder 14. When the data is determined to be DVCR-SD data, this data is outputted to the DVCR-SD decoder 15.

When this data is supplied, this data is then decoded by one of the MPEG-PS decoder 13, MPEG-TS decoder 14 or the DVCR-SD decoder 15, with a generated digital video signal then being outputted to the synthesis circuit 16 and the multiplexer 17-1 and a generated digital audio signal being outputted to the multiplexer 17-2.

The synthesis circuit 16 then synthesizes the digital video signals with a pattern designated by the control circuit 22 so that images corresponding to digital video signals supplied by the MPEG-PS decoder 13, MPEG-TS decoder 14 and DVCR-SD decoder 15 are displayed on one picture, with the synthesized digital video signal then being outputted to the multiplexer 17-1.

Figure 5:
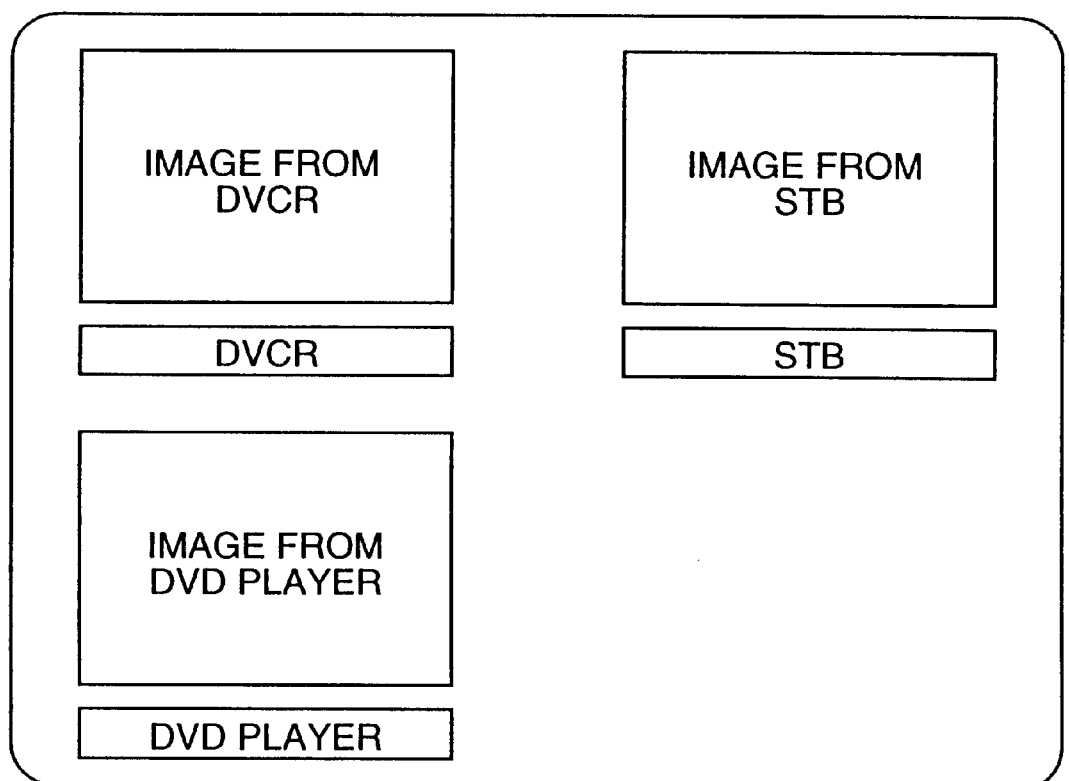
FIG. 5 is a view showing an example of a display for an image synthesized from a plurality of images.

FIG. 5 shows an example of displaying a synthesized image. In the example of the display of FIG. 5, the image corresponding to the SD data of the DVCR is displayed at a region to the upper left of the picture as the image from the DVCR 4, the image corresponding to the MPEG-TS data is displayed at a region to the upper right of the picture as the image from the STB 5 and the image corresponding to the MPEG-PS data is displayed at a region to the lower left of the picture as the image from the DVD player 2.

The name of the device supplying each image ("DVCR", "STB" and "DVD player" of FIG. 5) is displayed at the lower side of each region at which each image is displayed.

In this embodiment data of differing formats is received in asynchronous communications in parallel by the 1394 receiver 11. A plurality of images respectively corresponding to these data can therefore be displayed simultaneously on one picture in real time.

Next, of the supplied digital video signals, the multiplexer 17-1 outputs digital video signals designated by the control circuit 22 (i.e. selected as a result of user operations of the input part 23) to the display circuit 18. The display circuit 18 then displays images corresponding to the supplied video signals on the CRT 19.

On the other hand, of the supplied digital audio signals, the multiplexer 17-2 outputs digital audio signals designated by the control circuit 22 to the D/A converter 20. The D/A converter 20 then converts these digital audio signals into analog audio signals, with sound corresponding to these analog audio signals being outputted at the speaker 21.

In the above way, the digital TV 1 receives data of each format via the AV bus 6, decodes this data using a decoder corresponding to the format of this data and plays back images and sound.

In the AV system of FIG. 1, only one digital TV 1 is connected to the AV bus 6, but other digital TVs 1 can be connected to the AV bus 6, with data of a plurality of formats then being decoded in the same manner.

According to the present invention, data of the first to third formats is received via a digital interface conforming to IEEE 1394 standards and the received data is supplied to any of the first to third decoders in accordance with the formats of the data. The data can then be decoded at any of the first to third decoders. It is therefore possible to play back a plurality of kinds of image data using a single device and the scale of the device can therefore be reduced.

What is claimed is:

1. A receiving device for receiving data encoded in a prescribed data format from a plurality of transmitting devices via a digital interface and decoding said data in accordance with said prescribed data format, comprising:

a receiver for receiving at least data of first and second formats, in which said first and second formats are any two of a program stream format of a Moving Picture Experts Group (MPEG) system, a transport stream format of said MPEG system, and a standard definition format of a digital video cassette recorder;

a first decoder for decoding said data of first format;

a second decoder for decoding said data of second format; and a supplying unit for supplying data received by said receiver to either of said first and second decoders in accordance with a format of said data, wherein said data is included within a packet and said supplying unit supplies data received by said receiver to either of said first and second decoders in accordance with a value corresponding to a format of said data written to a prescribed region of said packet.

2. The receiving device of claim 1, wherein said prescribed region is a common isochronous packet header of an isochronous packet.

3. The receiving device of claim 2, wherein said digital interface is a digital interface conforming to an Institute of Electrical and Electronics Engineers 1394 standard.

4. The receiving device of claim 2, wherein said receiver is made to be capable of receiving data of a third format, and further comprises a third decoder for decoding said data of third format.

5. A receiving device for receiving data encoded in a prescribed data format from a plurality of transmitting devices via a digital interface and decoding said data in accordance with said prescribed data format, comprising:

a receiver for receiving at least data of first, second and third formats, in which said first and second formats are any two of a program stream format of a Moving Picture Experts Group (MPEG) system, a transport stream format of said MPEG system, and a standard definition format of a digital video cassette recorder;

a first decoder for decoding said data of first format;

a second decoder for decoding said data of second format;

a third decoder for decoding said data of third format; and a supplying unit for supplying data received by said receiver to either of said first and second decoders in accordance with a format of said data, wherein said first, second and third formats are a program stream format of a Moving Picture Experts Group (MPEG) system, a transport stream format of said MPEG system, and a standard definition format of digital video cassette recorder.

6. A receiving device for receiving data encoded in a prescribed data format from a plurality of transmitting devices via a digital interface and decoding said data in accordance with said prescribed data format, comprising:

a receiver for receiving at least data of first and second formats, in which said first and second formats are any two of a program stream format of a Moving Picture Experts Group (MPEG) system, a transport stream format of said MPEG system, and a standard definition format of a digital video cassette recorder;

a first decoder for decoding said data of first format;

a second decoder for decoding said data of second format; and a supplying unit for supplying data received by said receiver to either of said first and second decoders in accordance with a format of said data, wherein said first decoder decodes the data having the program stream format of said MPEG system and includes a first storage for temporarily storing data when decoding, said first storage having a storage capacity of at least 1.2 megabytes.

7. A receiving device for receiving data encoded in a prescribed data format from a plurality of transmitting devices via a digital interface and decoding said data in accordance with said prescribed data format, comprising:

a receiver for receiving at least data of first and second formats, in which said first and second formats are any two of a program stream format of a Moving Picture Experts Group (MPEG) system, a transport stream format of said MPEG system, and a standard definition format of a digital video cassette recorder;

a first decoder for decoding said data of first format;

a second decoder for decoding said data of second format; and a supplying unit for supplying data received by said receiver to either of said first and second decoders in accordance with a format of said data, wherein said second decoder decodes the data having the transport stream format of said MPEG system and includes a second storage for temporarily storing data when decoding, said second storage having a storage capacity of at least 1.2 megabytes.

8. A receiving method for receiving data encoded in a prescribed data format from a plurality of transmitting devices via a digital interface and decoding said data in accordance with said prescribed data format, comprising the steps of:

receiving at least data of first and second formats, in which said first and second formats are any two of a program stream format of a Moving Picture Experts Group (MPEG) system, a transport stream format of said MPEG system, and a standard definition format of a digital video cassette recorder;

supplying received data to either of first and second decoders in accordance with a format of said data; and decoding said data at either of said first and second decoders, wherein said data is included within a packet and said received data is supplied to either of said first and second decoders in accordance with a value corresponding to a format of said data written to a prescribed region of said packet.

9. The receiving method of claim 8, wherein said prescribed region is a common isochronous packet header of an isochronous packet.

10. A receiving method for receiving data encoded in a prescribed data format from a plurality of transmitting devices via a digital interface and decoding said data in accordance with said prescribed data format, comprising the steps of:

receiving at least data of first and second formats, in which said first and second formats are any two of a program stream format of a Moving Picture Experts Group (MPEG) system, a transport stream format of said MPEG system, and a standard definition format of a digital video cassette recorder;

supplying received data to either of first and second decoders in accordance with a format of said data; and decoding said data at either of said first and second decoders, wherein said digital interface is a digital interface conforming to an Institute of Electrical and Electronics Engineers 1394 standard.

11. A receiving method for receiving data encoded in a prescribed data format from a plurality of transmitting devices via a digital interface and decoding said data in accordance with said prescribed data format, comprising the steps of:

receiving at least data of first and second formats, in which said first and second formats are any two of a program stream format of a Moving Picture Experts Group (MPEG) system, a transport stream format of said MPEG system, and a standard definition format of a digital video cassette recorder;

supplying received data to either of first and second decoders in accordance with a format of said data; and decoding said data at either of said first and second decoders, wherein packets having data of whichever of said first and second formats are received, said data being transmitted in isochronous communications of an Institute of Electrical and Electronics Engineers 1394 standard.

12. A receiving device for receiving data encoded in a prescribed data format from a plurality of transmitting devices via a digital interface and decoding said data in accordance with said prescribed data format, comprising:

a receiver for receiving at least data of first and second formats;

a first decoder for decoding said data of first format;

a second decoder for decoding said data of second format;

a supplying unit for supplying data received by said receiver to either of said first and second decoders in accordance with a format of said data;

a multiplexer to which data outputted from said first and second decoders are inputted; and a display circuit for displaying output data from said multiplexer, wherein said receiver receives packets having data of whichever of said first and second formats transmitted in isochronous communications of an Institute of Electrical and Electronics Engineers 1394 standard, wherein said receiver receives said data of first and second formats in parallel in said isochronous communications, and wherein said display circuit displays a plurality of images corresponding to each of said data simultaneously in a single picture in real time.

13. A receiving method for receiving data encoded in a prescribed data format from a plurality of transmitting devices via a digital interface and decoding said data in accordance with said prescribed data format, comprising the steps of:

receiving at least data of first and second formats;

supplying received data to either of first and second decoders in accordance with a format of said data; and decoding said data at either of said first and second decoders, wherein each of data outputted from said first and second decoders is multiplexed and multiplexed output data is displayed, wherein packets having data of whichever of said first and second formats are received and said data is transmitted in isochronous communications of an Institute of Electrical and Electronics Engineers 1394 standard, wherein said data of first and second formats are received in parallel in said isochronous communications, and wherein a plurality of images each corresponding to each of said data are displayed simultaneously in a single picture in real time.

14. A receiving device for receiving data encoded in a prescribed data format from a plurality of transmitting devices via a digital interface and decoding said data in accordance with said prescribed data format, comprising:

receiver means for receiving at least data of first and second formats, in which said first and second formats are any two of a program stream format of Moving Picture Experts Group system, a transport stream format of Moving Picture Experts Group system, and a standard definition format of digital video cassette recorder;

first decoder means for decoding said data of first format;

second decoder means for decoding said data of second format; and supplying means for supplying data received by said receiver means to either of said first and second decoder means in accordance with a format of said data, wherein said data is included within a packet and said supplying means supplies data received by said receiver means to either of said first and second decoder means in accordance with a value corresponding to a format of said data written to a prescribed region of said packet.

15. The receiving device of claim 14, wherein said prescribed region is a common isochronous packet header of an isochronous packet.

16. The receiving device of claim 2, wherein said digital interface is a digital interface conforming to an Institute of Electrical and Electronics Engineers 1394 standard.

17. A receiving device for receiving data encoded in a prescribed data format from a plurality of transmitting devices via a digital interface and decoding said data in accordance with said prescribed data format, comprising:

receiver means for receiving at least data of first and second formats, in which said first and second formats are any two of a program stream format of Moving Picture Experts Group system, a transport stream format of Moving Picture Experts Group system, and a standard definition format of digital video cassette recorder;

first decoder means for decoding said data of first format;

second decoder means for decoding said data of second format;

supplying means for supplying data received by said receiver means to either of said first and second decoder means in accordance with a format of said data;

multiplexer means for receiving data outputted from said first and second decoder means; and display means for displaying output data from said multiplexer means, wherein said receiver means receives packets having data of whichever of said first and second formats transmitted in isochronous communications of an Institute of Electrical and Electronics Engineers 1394 standard, wherein said receiver means receives said data of first and second formats in parallel in said isochronous communications, and wherein said display means displays a plurality of images corresponding to each of said data simultaneously in a single picture in real time.

18. The receiving device of claim 2, wherein said receiver means is made to be capable of receiving data of a third format, and further comprises third decoder means for decoding said data of third format.

19. A receiving device for receiving data encoded in a prescribed data format from a plurality of transmitting devices via a digital interface and decoding said data in accordance with said prescribed data format, comprising:

receiver means for receiving at least data of first, second and third formats, in which said first and second formats are any two of a program stream format of Moving Picture Experts Group system, a transport stream format of Moving Picture Experts Group system, and a standard definition format of digital video cassette recorder;

first decoder means for decoding said data of first format;

second decoder means for decoding said data of second format;

third decoder means for decoding said data of third format; and supplying means for supplying data received by said receiver means to either of said first and second decoder means in accordance with a format of said data, wherein said first, second and third formats are a program stream format of Moving Picture Experts Group system, a transport stream format of Moving Picture Experts Group system, and a standard definition format of digital video cassette recorder.

20. A receiving device for receiving data encoded in a prescribed data format from a plurality of transmitting devices via a digital interface and decoding said data in accordance with said prescribed data format, comprising:

receiver means for receiving at least data of first and second formats, in which said first and second formats are any two of a program stream format of Moving Picture Experts Group system, a transport stream format of Moving Picture Experts Group system, and a standard definition format of digital video cassette recorder;

first decoder means for decoding said data of first format;

second decoder means for decoding said data of second format; and supplying means for supplying data received by said receiver means to either of said first and second decoder means in accordance with a format of said data, wherein said first decoder means decodes the data having the program stream format of said MPEG system and includes first storage means for temporarily storing data when decoding, said first storage means having a storage capacity of at least 1.2 megabytes.

21. A receiving device for receiving data encoded in a prescribed data format from a plurality of transmitting devices via a digital interface and decoding said data in accordance with said prescribed data format, comprising:

receiver means for receiving at least data of first and second formats, in which said first and second formats are any two of a program stream format of Moving Picture Experts Group system, a transport stream format of Moving Picture Experts Group system, and a standard definition format of digital video cassette recorder;

first decoder means for decoding said data of first format;

second decoder means for decoding said data of second format; and supplying means for supplying data received by said receiver means to either of said first and second decoder means in accordance with a format of said data, wherein said second decoder means decodes the data having the transport stream format of said MPEG system and includes second storage means for temporarily storing data when decoding, said second storage means having a storage capacity of at least 1.2 megabytes.

22. A receiving device for receiving data encoded in a prescribed data format from a plurality of transmitting devices via a digital interface and decoding said data in accordance with said prescribed data format, comprising:

receiver means for receiving at least data of first and second formats;

first decoder means for decoding said data of first format;

second decoder means for decoding said data of second format;

supplying means for supplying data received by said receiver means to either of said first and second decoder means in accordance with a format of said data;

multiplexer means for receiving data outputted from said first and second decoder means; and display means for displaying output data from said multiplexer means, wherein said receiver means receives packets having data of whichever of said first and second formats transmitted in isochronous communications of an Institute of Electrical and Electronics Engineers 1394 standard, wherein said receiver means receives said data of first and second formats in parallel in said isochronous communications, and wherein said display means displays a plurality of images corresponding to each of said data simultaneously in a single picture in real time.

* * * * *